United States Patent
Sangal et al.

(10) Patent No.: US 10,477,394 B2
(45) Date of Patent: Nov. 12, 2019

(54) MITIGATING DRAWBACKS OF CIPHERING FAILURES IN A WIRELESS NETWORK

(71) Applicant: Telefonaktiebolaget LM Ericsson (publ), Stockholm (SE)

(72) Inventors: Sapna Sangal, Karnataka (IN); Vidha Agarwal, Karnataka (IN); Marcus Davidsson, Lund (SE); Anne-Lott Hedberg, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 143 days.

(21) Appl. No.: 15/538,428

(22) PCT Filed: Feb. 11, 2015

(86) PCT No.: PCT/EP2015/052852
§ 371 (c)(1),
(2) Date: Jun. 21, 2017

(87) PCT Pub. No.: WO2016/102077
PCT Pub. Date: Jun. 30, 2016

(65) Prior Publication Data
US 2017/0339560 A1   Nov. 23, 2017

(30) Foreign Application Priority Data
Dec. 22, 2014  (IN) .......................... 3833/DEL/2014

(51) Int. Cl.
*H04W 12/06* (2009.01)
*H04W 12/02* (2009.01)
*H04W 12/04* (2009.01)
*H04W 8/02* (2009.01)
*H04W 12/00* (2009.01)
(Continued)

(52) U.S. Cl.
CPC ............... *H04W 12/06* (2013.01); *H04L 9/12* (2013.01); *H04W 8/02* (2013.01);
(Continued)

(58) Field of Classification Search
CPC ... H04W 56/00; H04W 56/001; H04W 12/00; H04W 12/02; H04W 12/04; H04W 12/06; H04W 12/10; H04W 76/19
See application file for complete search history.

(56) References Cited

U.S. PATENT DOCUMENTS

2004/0038700 A1   2/2004  Gibbs
2004/0053623 A1   3/2004  Hoff et al.
(Continued)

FOREIGN PATENT DOCUMENTS

WO   2013192173 A1   12/2013

OTHER PUBLICATIONS

3GPP TS 24.008 V13.0.0 (Dec. 2014) (Year: Dec. 2014).*
(Continued)

*Primary Examiner* — Daniel B Potratz
*Assistant Examiner* — D'Arcy Winston Straub
(74) *Attorney, Agent, or Firm* — Leffler Intellectual Property Law, PLLC (57) ABSTRACT

A wireless communication device communicates with a GPRS wireless network where ciphering has gone out of sync between the wireless communication device and the wireless network. The wireless communication device triggers an authentication procedure that re-synchronizes the ciphering. Following the trigger, the wireless communication device and the wireless network continue the authentication procedure so that ciphering parameters can be negotiated again and data communication can resume.

15 Claims, 6 Drawing Sheets

(51) Int. Cl.
*H04W 76/19* (2018.01)
*H04L 9/12* (2006.01)
*H04L 12/10* (2006.01)
*H04L 12/801* (2013.01)

(52) U.S. Cl.
CPC ....... *H04W 12/0013* (2019.01); *H04W 12/02* (2013.01); *H04W 12/04* (2013.01); *H04L 12/10* (2013.01); *H04L 47/14* (2013.01); *H04L 2209/80* (2013.01); *H04W 76/19* (2018.02)

(56) References Cited

U.S. PATENT DOCUMENTS

| | | | |
|---|---|---|---|
| 2008/0101595 A1* | 5/2008 | Lee | H04L 1/0045 380/28 |
| 2011/0103311 A1* | 5/2011 | Navratil | H04L 1/1685 370/328 |
| 2012/0170744 A1 | 7/2012 | Cheng | |
| 2012/0170746 A1 | 7/2012 | Chen et al. | |
| 2014/0036866 A1 | 2/2014 | Seon et al. | |
| 2016/0142936 A1* | 5/2016 | Bressanelli | H04L 12/6418 370/242 |

OTHER PUBLICATIONS

3GPP TS 44.064 V12.0.0 (Sep. 2014) (Year: Sep. 2014).*
3GPP TS 24.008 V13.0.0, Dec. 2014, 3rd Generation Partnership Project; Technical Specification Group Core Network and Terminals; Mobile radio interface Layer 3 specification; Core network protocols; Stage 3; Release 13, pp. 1-705 (Year: 2014).*
3GPP TS 44.064 V12.0.0, Sep. 2014, 3rd Generation Partnership Project; Technical Specification Group Core Network and Terminals; Mobile Station—Serving GPRS Support Node (MS-SGSN); Logical Link Control (LLC) layer specification, Release 12, pp. 1-64 (Year: 2014).*
3GPP TS 24.008 V13.0.0, Dec. 2014, 3rd Generation Partnership Project; Technical Specification Group Core Network and Terminals; Mobile radio interface Layer 3 specification; Core network protocols; Stage 3; Release 13, pp. 1-705.
3GPP TS 44.064 V12.0.0, Sep. 2014, 3rd Generation Partnership Project; Technical Specification Group Core Network and Terminals; Mobile Station—Serving GPRS Support Node (MS-SGSN); Logical Link Control (LLC) layer specification, Release 12, pp. 1-64.
PCT International Search Report, dated May 4, 2015, in connection with International Application No. PCT/EP2015/052852, all pages.
PCT Written Opinion, dated May 4, 2015, in connection with International Application No. PCT/EP2015/052852, all pages.
Menezes A J et al., Chapter 6: Stream Ciphers ED, Handbook of Applies Cryptography, CRC Press Series on Discrete Mathematics and Its Applications, CRC Press, Boca Raton, FL, US, Oct. 1, 1996, pp. 191-222.

* cited by examiner

MITIGATING DRAWBACKS OF CIPHERING FAILURES IN A WIRELESS NETWORK

TECHNICAL FIELD

Embodiments herein relate to a method performed by a wireless communication device when communicating with a general packet radio service (GPRS) wireless network.

BACKGROUND

In a wireless network such as a third generation partnership project (3GPP) GPRS wireless network that operates according to a global system for mobile communications (GSM) standard ciphering of packet service (PS) data is performed in a logical link control (LLC) layer. Ciphering parameters that are needed for the ciphering to operate are negotiated between wireless communication devices and a network by a GPRS mobility management (GMM) entity. A GMM entity is a functional block that has an interface to a lower LLC layer in the communication protocol stack.

Due to various disturbing effects on radio signals carrying the enciphered data along a radio path of an uplink and/or downlink between a wireless communication device and the wireless network, the ciphering may get unsynchronized. That is, data that has been enciphered at the wireless communication device cannot be deciphered at a receiving network node, and vice versa. When this occurs, neither the wireless communication device, nor the network node is able to receive anything successfully. This typically leads to a data connection between the entities being aborted and the wireless communication device enters an idle state. If this situation occurs during a GMM routing area update procedure, then it is a severe drawback since the wireless communication device is in such a situation not able to register itself in a packet domain. For example, this will lead to a permanent packet service (PS) registration failure as the wireless communication device will never be able to receive routing area update accept messages in a downlink direction and, as a consequence, the wireless communication device will keep on retransmitting routing area update requests. This issue can be seen in case of buggy networks and in an IRAT scenario where a wireless communication device moves from, e.g., a third or fourth generation radio network to a GPRS network. Sometimes in such scenarios a wireless communication device is not able to get a correct ciphering key and it is thereby not able to decipher received enciphered downlink data and hence it will be unable to register successfully in the GPRS network.

In United States patent application publication US2004/0053623 problems with unsynchronized ciphering parameters are discussed. Ciphering is re-synchronized by way of specific LLC signaling between a mobile station and a serving GPRS support node.

SUMMARY

In order to at least mitigate at least some of the drawbacks as discussed above, different aspects and embodiments are provided in the present disclosure.

One aspect provides a method performed by a wireless communication device when communicating with a GPRS wireless network. The method comprises:

receiving, in a LLC entity in the wireless communication device, enciphered downlink data from a LLC entity in the wireless network, determining, in the LLC entity in the wireless communication device, that the enciphered downlink data cannot be deciphered, providing, from the LLC entity in the wireless communication device as a consequence of the determination that the enciphered downlink data cannot be deciphered, a ciphering failure indicator to a GMM entity in the wireless communication device, receiving, in the GMM entity in the wireless communication device, the ciphering failure indicator and, as a consequence of the reception of the ciphering failure indicator in the GMM entity in the wireless communication device, providing an authentication procedure trigger from the GMM entity in the wireless communication device to a GMM entity in the wireless network, and operating an authentication procedure wherein the GMM entity in the wireless communication device communicates with a GMM entity in the wireless network via the respective LLC entities in the wireless communication device and the wireless network, whereby the LLC entity in the wireless communication device obtains information for enabling enciphering and deciphering in subsequent communication between the LLC entity in the wireless communication device and the LLC entity in the wireless network.

In some embodiments, the provision of an authentication procedure trigger from the GMM entity in the wireless communication device to a GMM entity in the wireless network may comprise transmitting any of a routing area update request message and an attach request message that comprises a ciphering key sequence number (CKSN) information element having a value of 7.

In some embodiments, the GMM entity in the wireless communication device receives a CKSN in a GMM authentication and ciphering request message. The received CKSN identifies a security context that comprises a security key.

In some embodiments, the security key is obtained in the GMM entity in the wireless communication device from the security context identified by the received CKSN. In these embodiments, the obtaining of the information for enabling enciphering and deciphering in subsequent communication between the LLC entity in the wireless communication device and the LLC entity in the wireless network comprises receiving, in the LLC entity in the wireless communication device, the security key from the GMM entity in the wireless communication device.

In other words, drawbacks are mitigated in a situation where ciphering has gone out of sync between the wireless communication device and the wireless network. The wireless communication device triggers an authentication procedure that re-synchronizes the ciphering, for example by transmitting a CKSN with a value "7" in a routing area update or attach request message to the wireless network. On such a request, the wireless communication device and the wireless network continue the authentication procedure so that ciphering parameters can be negotiated again and data communication can resume.

Further aspects provide a wireless communication device, a computer program and a carrier comprising such computer program that correspond to the aspect as summarized above. The effects and advantages of these further aspects correspond to those summarized above in connection with the method performed by the wireless communication device.

DETAILED DESCRIPTION

Figure 1:
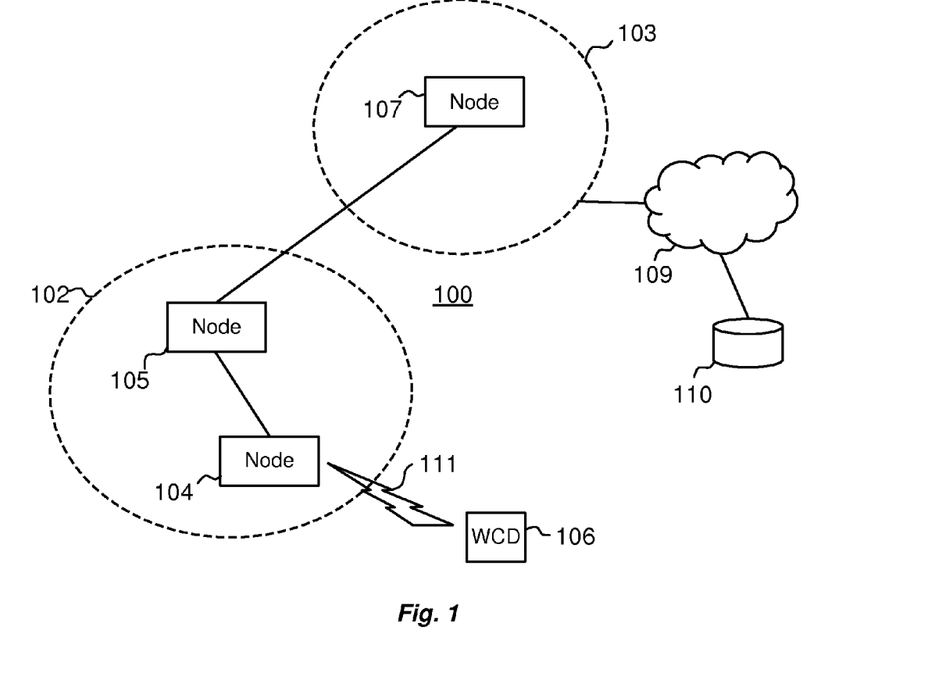
FIG. 1 schematically illustrates a wireless network 100.

FIG. 1 illustrates schematically an exemplifying wireless network 100 in which embodiments herein may be implemented. The wireless network 100 may be any 3GPP wireless network, such as a Universal Mobile Telecommunication System (UMTS) Wideband Code Division Multiple Access (WCDMA) network, a Global System for Mobile communication (GSM), or the like. The wireless communication system 100 may be an evolution of any one of the aforementioned systems or a combination thereof, including a Long Term Evolution (LTE) wireless network.

The wireless network 100 may comprise a number of different nodes distributed in a radio access network 102 and a core network 103.

Nodes in the wireless network 100 may be denoted "network node" and, for example, refer to a Base Station (BS), a Base Transceiver Station (BTS), a Radio Base Station (RBS), a Remote Radio Unit (RRU), an access point, a NodeB in 3G networks, evolved NodeB (eNodeB or eNB) in LTE networks, or the like. In UMTS Terrestrial Radio Access Network (UTRAN) networks, a node may also be a Radio Network Controller (RNC). Furthermore, in GSM EDGE Radio Access Network, GERAN, where EDGE is short for Enhanced Data rates for GSM Evolution, the term "network node" may also refer to a Base Station Controller (BSC).

As FIG. 1 shows, a node 104 may be connected to other nodes in the system, exemplified here by a node 105 in the radio access network 102 and further connected to a node 107, which may represent any entity in the core network 103 and further nodes, such as node 110 in another network 109. It is to be noted, however, that any details regarding communication with such entities is outside the scope of the present disclosure.

A number of wireless communication devices (WCD) may be operating in connection with the wireless network 100. One such wireless communication device 106 is shown being in connection with the wireless network 100 via a radio interface 111 with the node 104 in the radio access network 102. The wireless communication device 106 and typically many other wireless communication devices are located in cells (not illustrated) that are under the control of, e.g., a base station, which may be represented by the node 104.

In the following description of methods performed by a wireless communication device, communication will take place between a wireless communication device and a network node, which may be a serving GPRS support node (SGSN) represented by node 107 in FIG. 1. The nodes 104 and 105 in FIG. 1 may in such examples be a base transceiver station (BTS) and a base station controller (BSC), respectively.

As used herein, the term "wireless communication device" may refer to a user equipment (UE), a subscriber unit, mobile station (MS) mobile phone, a cellular phone, a Personal Digital Assistant (PDA), equipped with radio communication capabilities, a smartphone, a laptop or personal computer (PC), equipped with an internal or external mobile broadband modem, a tablet PC with radio communication capabilities, a portable electronic radio communication device or the like. As will be described in some detail in the following, focus will be made on communication between the wireless communication device 106 and a network node such as the base station 104.

Figure 2A:
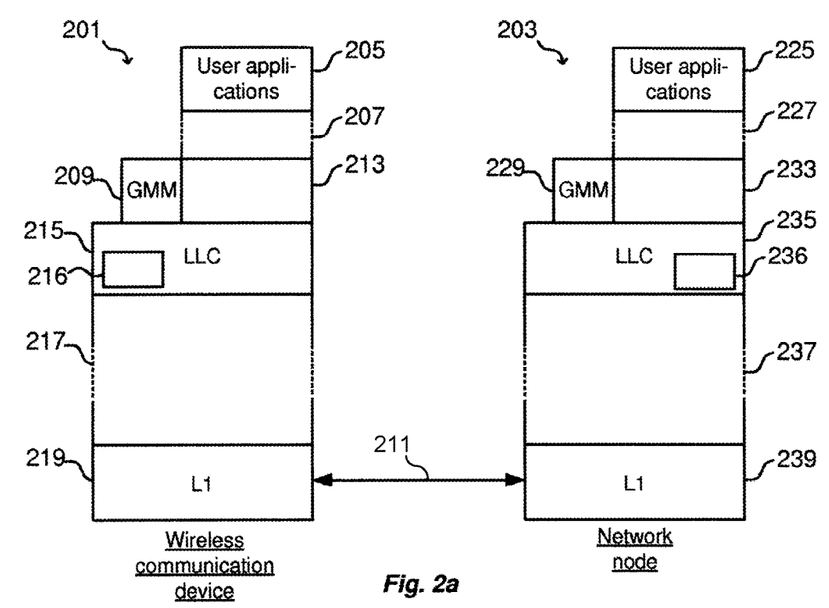
FIG. 2a schematically illustrates communication protocol stacks.

In FIG. 2a, communication protocol stacks 201, 203 in a wireless communication device and in a network node, respectively, are schematically illustrated. The wireless communication device in FIG. 2a may correspond to the wireless communication device 106 in FIG. 1 and the network node in FIG. 2a may correspond to the network node 107 (e.g. a SGSN) in FIG. 1. At lowest levels or layers 219, 239 communication 211 takes place via a radio interface such as the radio interface 111 illustrated in FIG. 1, details of which are outside the scope of the present disclosure. Higher levels 217, 237 of the communication protocol stacks are also involved in the communication between the wireless communication device and, as for the lower layers 219, 239 the details regarding this communication are outside the scope of the present disclosure.

Communication between LLC layers 215, 235 involves a respective LLC entity 216, 236 in the wireless communication device and the network node, respectively. Above the LLC layers 215, 235 are a number of communication entities such as GPRS mobility management (GMM) 209, 229 and user data handling entities 213, 233 handling user data to and from respective user applications 205, 225. As FIG. 2a shows, the user applications 205, 225 communicate via further intermediate layers 207, 227 including, e.g., an internet protocol (IP) layer.

Figure 2B:
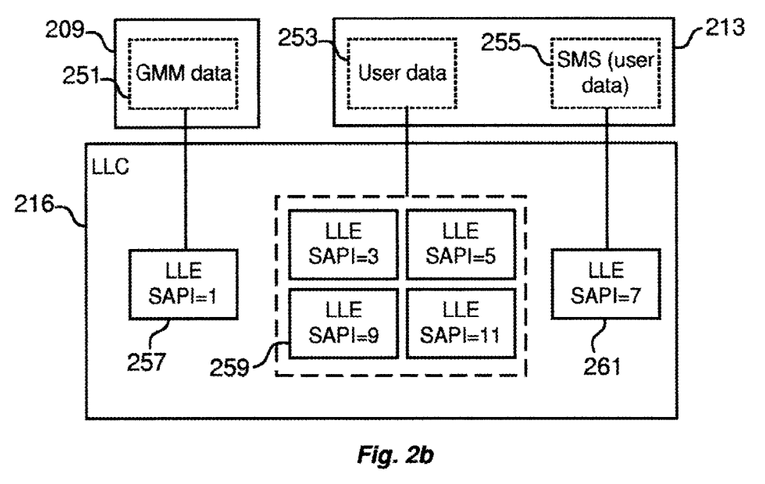
FIG. 2b schematically illustrates functional entities associated with the communication protocol stacks in FIG. 2a, FIG. 3 is a flowchart of a method in a wireless communication device.

FIG. 2b is a more detailed view, although still schematically illustrated, of the LLC entity 216 in the wireless communication device in FIG. 2a. FIG. 2b illustrates that GMM data 251 is provided by the GMM entity 209 to a logical link entity (LLE) 257 having a service access point identifier (SAPI) that is equal to 1. Similarly, the user data handling entity 213 provides user data 253 to any of a number of LLEs with SAPI equal to 3, 5, 7 or 9, one of which, LLE having a SAPI equal to 9, is referenced by reference numeral 259. User data in the form of short message service (SMS) data 255 is provided by the user data handling entity 213 to a LLE having a SAPI equal to 7.

The entities illustrated in FIG. 2b are to be understood as function blocks that are implemented by a combination of hardware circuits and controlling software, e.g. in the form of separate processes in an operating system. The entity 216 represents different LLE entities that offer various services to higher layer protocol to exchange information with its peer entities in the network node. The entity 257 is used to send/receive the enciphered/de-cipher the GMM data. The entity 261 is used to exchange the SMS data. The entity 259 is dedicated to encipher/decipher the user data.

Figure 3:
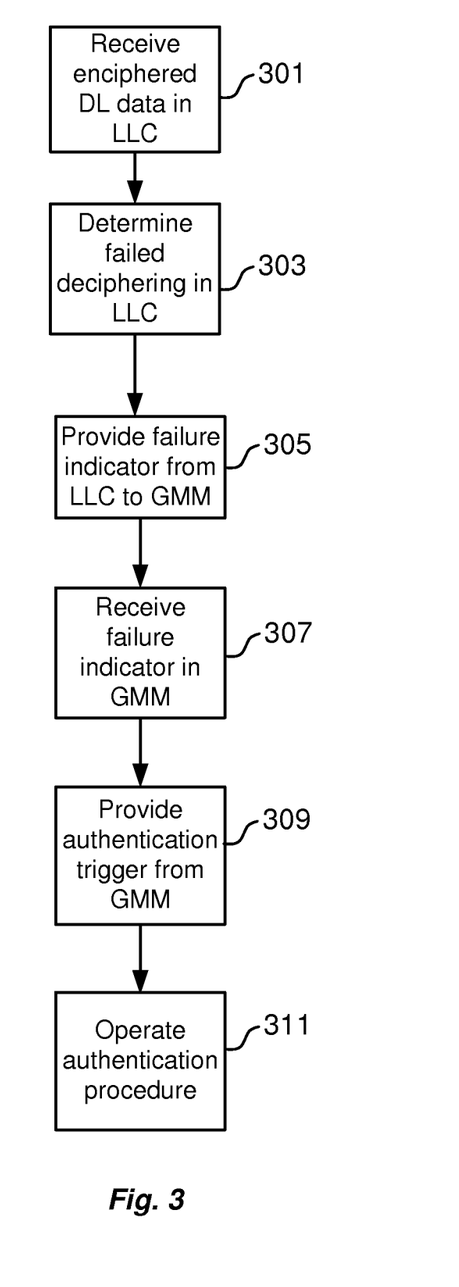

Turning now to FIG. 3, a method will be described in terms of a number of actions performed by a wireless communication device such as the wireless communication device 106 illustrated in FIG. 1, which operates by means of an LLC entity and a GMM entity such as the LLC entity 216 and GMM entity 209 in FIGS. 2a and 2b. The communication takes place in connection with an LLC entity and a GMM entity, such as the LLC and GMM entities 236 and 229 in FIG. 2a, in a wireless network such as the wireless network 100 in FIG. 1. In the example of FIG. 3, the wireless network is in the form of a GPRS wireless network. Implementation in other types of networks will involve use of corresponding entities, as the skilled person will realize.

As illustrated in FIG. 3, the method performed by the wireless communication device when communicating with a GPRS wireless network comprises actions as follows:

Action 301

Enciphered downlink data is received in a LLC entity in the wireless communication device from a LLC entity in the wireless network.

Action 303

A determination is made in the LLC entity in the wireless communication device, that the enciphered downlink data cannot be deciphered.

In some embodiments, the reception in action 301 of enciphered downlink data may comprise reception of enciphered GMM data via a LLE having a SAPI equal to 1. In these embodiments, the determination that the enciphered downlink data cannot be deciphered may comprise a determination of a first predetermined number of cyclic redundancy check, CRC, failures associated with the received enciphered GMM data.

In some embodiments, the reception of enciphered downlink data may comprise reception of enciphered user data via a LLE having a SAPI equal to any of 3, 5, 7, 9 and 11. In these embodiments, the determination that the enciphered downlink data cannot be deciphered may comprise a determination of a second predetermined number of CRC failures associated with the received enciphered user data. For example, the second predetermined number of CRC failures associated with the received enciphered user data may be greater than the first predetermined number of CRC failures associated with the received enciphered GMM data.

Action 305

As a consequence of the determination that the enciphered downlink data cannot be deciphered, a ciphering failure indicator is provided from the LLC entity in the wireless communication device to a GMM entity in the wireless communication device.

Actions 307 and 309

The ciphering failure indicator is received in the GMM entity in the wireless communication device and as a consequence of the reception of this ciphering failure indicator in the GMM entity in the wireless communication device, an authentication procedure trigger is provided from the GMM entity in the wireless communication device to a GMM entity in the wireless network.

In some embodiments, the provision of an authentication procedure trigger from the GMM entity in the wireless communication device to the GMM entity in the wireless network may comprise transmitting any of a routing area update request message and an attach request message that comprises a CKSN information element having a value of 7.

Action 311

An authentication procedure is operated wherein the GMM entity in the wireless communication device communicates with the GMM entity in the wireless network via the respective LLC entities in the wireless communication device and the wireless network, whereby the LLC entity in the wireless communication device obtains information for enabling enciphering and deciphering in subsequent communication between the LLC entity in the wireless communication device and the LLC entity in the wireless network. For example, the GMM entity in the wireless communication device may receive a CKSN in a GMM authentication and ciphering request message. The received CKSN identifies a security context that comprises a security key. In some of these examples, the security key may be obtained in the GMM entity from the security context identified by the received CKSN. Then, the obtaining of the information for enabling enciphering and deciphering in subsequent communication between the LLC entity in the wireless communication device and the LLC entity in the wireless network comprises receiving, in the LLC entity in the wireless communication device, the security key from the GMM entity in the wireless communication device.

Figure 4:
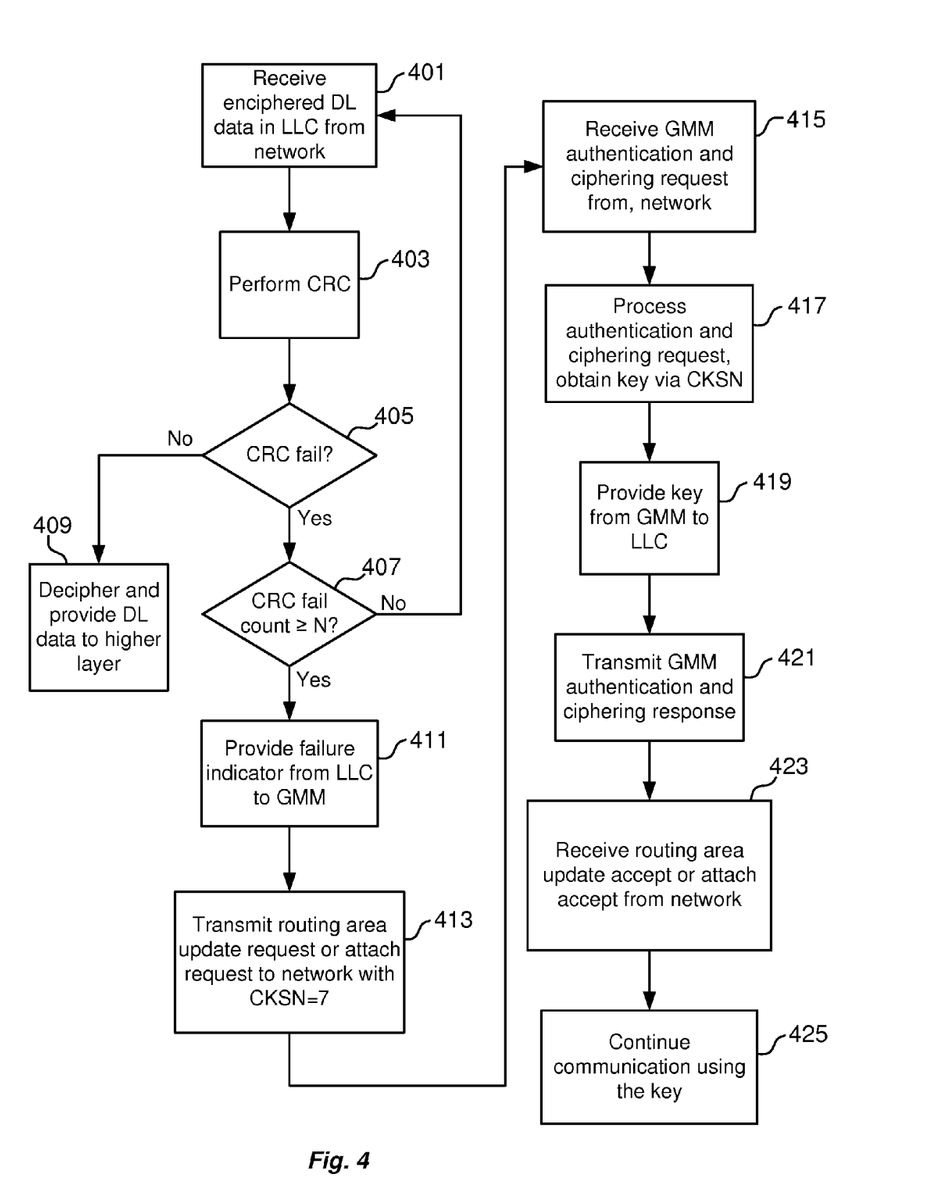
FIG. 4 is a flowchart of a method in a wireless communication device.
Figure 5:
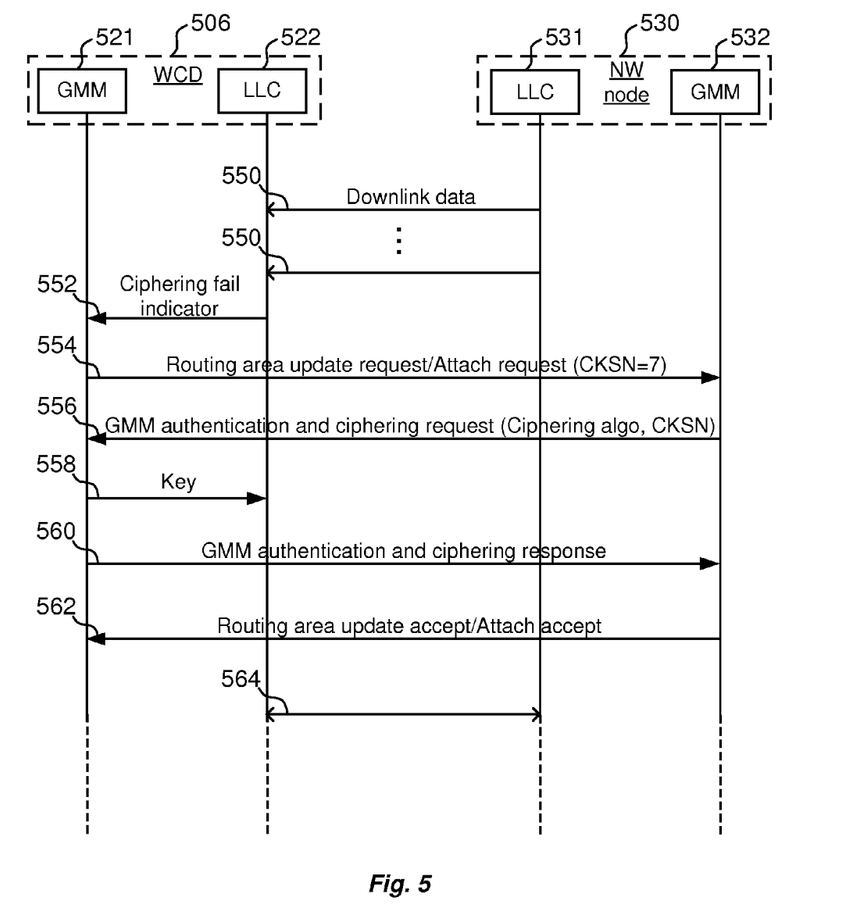
FIG. 5 is a signalling diagram that is associated with the flowchart in FIG. 4, FIG. 6 schematically illustrates a block diagram of a wireless communication device, and FIG. 7 schematically illustrates a block diagram of a wireless communication device.

Turning now to FIG. 4 and FIG. 5 and with continued reference to FIGS. 1, 2a and 2b, further embodiments of a method performed by a wireless communication device when communicating with a GPRS wireless network will be described. Similar to the embodiments described above in connection with FIGS. 1 to 3, the embodiments will be described in terms of a number of actions performed by a wireless communication device 506, which may correspond to the wireless communication device 106 illustrated in FIG. 1. In FIG. 5, the wireless communication device 506 is denoted UE. The wireless communication device 506 operates by means of an LLC entity 522 and a GMM entity 521 such as the LLC entity 216 and GMM entity 209 in FIGS. 2a and 2b. As discussed above, the LLC entity 522 and a GMM entity 521 in the wireless communication device 506 may be realized by means of separate processes in an operating system.

The communication takes place in connection with an LLC entity 531 and a GMM entity 532 in a wireless network node 530, such as the LLC and GMM entities 236 and 229 in FIG. 2a, which may be comprised in any of the nodes 104, 105 in the wireless network 100 in FIG. 1. Similar to the embodiments described above, in the example of FIG. 5, the wireless network is in the form of a GPRS wireless network. Implementation in other types of networks will involve use of corresponding entities, as the skilled person will realize.

Action 401

Enciphered downlink data 550 is received in the LLC entity 522 in the wireless communication device 506 from the LLC entity 531 in the network node 530. The downlink data 550 may be any GMM data as well as user data from user applications and SMS data that are received via LLEs having SAPI=1, 3, 5, 7, 9, or 11 as discussed above.

Action 403

A CRC is made on the received downlink data 550.

Action 405

A determination is made whether or not the CRC in action 403 failed.

Action 407

A check is made whether or not a CRC failure has occurred less than a predetermined number of times (denoted N in FIG. 4). According to this check, the determination in action 405 may be performed a number of times N, where the value of N may depend on the reception of the downlink data. If a CRC failure has occurred less than N times, reception is repeated in action 401.

For example, in case the reception of enciphered downlink data comprises reception of enciphered GMM data via a logical link entity having a service access point identifier, SAPI, equal to 1, then the determination that the enciphered downlink data cannot be deciphered comprises a determination of a first predetermined number (i.e. a first N value) of CRC failures associated with the received enciphered GMM data.

In another example, in case the reception of enciphered downlink data comprises reception of enciphered user data via a logical link entity having a service access point identifier, SAPI, equal to any of 3, 5, 7, 9 and 11, then the determination that the enciphered downlink data cannot be deciphered comprises a determination of a second predetermined number (i.e. a second N value) of CRC failures associated with the received enciphered user data.

The second predetermined number of CRC failures, that is associated with the user data, is in some embodiments larger than the first number of predetermined number of CRC failures, which is associated with the GMM data. That is, since user data is typically less critical than GMM data, it is acceptable to wait several retransmissions of the downlink data 550 before resolving the problem by operating an authentication procedure. In fact, it is advisable to handle GMM data failures early since no user data communication can take place until all GMM data has been received successfully.

Action 409

If no failure is determined in action 405 in the CRC in action 403, the downlink data 550 is deciphered and provided to a higher layer in the communication protocol stack 201.

Action 411

When it has been determined that the downlink data 550 could not be deciphered, for example as determined by a number of CRC failures, then the LLC entity 522 in the wireless communication device 506 provides a ciphering failure indicator 552 to the GMM entity 521 in the wireless communication device 506. The ciphering failure indicator 552 may be in the form of a status message with a cause "Ciphering Failure". This will be internal to the wireless communication device and the network node will not be aware of this cause. But this cause will trigger a CKSN renegotiation procedure as follows.

Action 413

As a consequence of receiving the ciphering failure indicator 552, the GMM entity 521 in the wireless communication device 506 transmits a message 554 to the GMM entity 532 in the network node 530. For example, the message 554 may be a routing area update request message and the message may also be an attach request message. In any case, the message 554 comprises a CKSN information element that has a value of 7.

A CKSN information element with value 7 has a defined meaning of "No key is available" in the context of transmission of such request messages from the wireless communication device 506 to the network node 530. After receiving a message having a CKSN=7, the GMM entity 532 in the network node 530 will understand that the wireless communication device does not have valid authentication parameter and hence will trigger an authentication procedure as follows.

The GMM entity 532 in the network node 530 will transmit a GMM authentication and ciphering request message 556 to the GMM entity 521 in the wireless communication device 506. The authentication and ciphering request message 556 comprises a CKSN information element that has a value that may be used by the wireless communication device 506 in subsequent enciphered communication between the wireless communication device 506 and the network node 530. More specifically, the received CKSN identifies a security context that comprises a security key that may be used for the subsequent enciphered communication.

Action 415

The GMM entity 521 in the wireless communication device 506 receives the GMM authentication and ciphering request message 556 from the GMM entity 532 in the network node 530.

Action 417

The GMM entity 521 in the wireless communication device 506 processes the authentication and ciphering request message 556. In this processing, the security key in the security context identified by the CKSN value of the authentication and ciphering request message 556 is obtained.

Action 419

The security key obtained from the security context identified by the CKSN value is provided via a message 558 from the GMM entity 521 in the wireless communication device 506 to the LLC entity 522 in the wireless communication device 506.

Action 421

The GMM entity 521 in the wireless communication device 506 transmits an authentication and ciphering response message 560 to the GMM entity 532 in the network node 530, which is processed according to standard procedures in the network node 530, whereupon the GMM entity 532 in the network node 530 transmits an accept message 562 to the GMM entity 521 in the wireless communication device 506. This accept message 562 is an accept message for the request message 554 transmitted by the GMM entity 521 in the wireless communication device 506 in action 413.

Action 423

The accept message 562 is received in the GMM entity 521 in the wireless communication device 506, thus concluding the routing area or attach procedure that was initiated by the transmission of the request message 554 in action 413. Although the authentication procedure is independent of the routing area or attach procedures, the authentication procedure is also concluded by the reception of the accept message 562.

Action 425

Having received it in action 415, the LLC entity 522 in the wireless communication device 506 is in possession of the security key received in message 558 and uses this security key in encrypted communication with the LLC entity 531 in the network node 530 as illustrated by signals 564.

Figure 6:
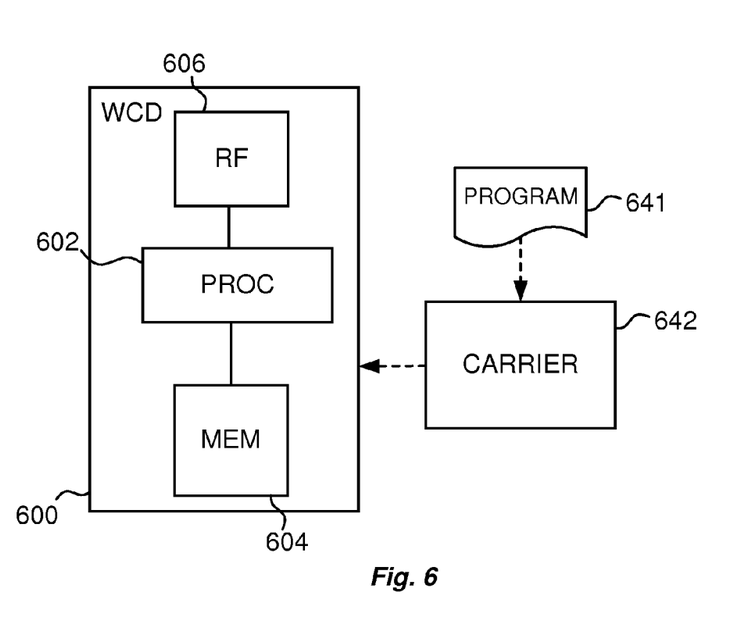

Turning now to FIG. 6, embodiments of a wireless communication device 600 will be described in some more detail. The wireless communication device 600, which may be one of the wireless communication devices 106, 506 discussed above in connection with FIGS. 1-5, is for communication with a GPRS wireless network, such as the wireless network 100. The wireless communication device 600 comprises radio frequency circuitry 606, a processor 602 and a memory 604. The memory 604 contains instructions executable by the processor 602 whereby the wireless communication device 600 is operative to:

receive, in a logical link control, LLC, entity in the wireless communication device, enciphered downlink data from a LLC entity in the wireless network, determine, in the LLC entity in the wireless communication device, that the enciphered downlink data cannot be deciphered, provide, from the LLC entity in the wireless communication device as a consequence of the determination that the enciphered downlink data cannot be deciphered, a ciphering failure indicator to a GPRS mobility management, GMM, entity in the wireless communication device, receive, in the GMM entity in the wireless communication device, the ciphering failure indicator and, as a consequence of the reception of the ciphering failure indicator in the GMM entity in the wireless communication device, providing an authentication procedure trigger from the GMM entity in the wireless communication device to a GMM entity in the wireless network, and operate an authentication procedure wherein the GMM entity in the wireless communication device communicates with the GMM entity in the wireless network via the respective LLC entities in the wireless communication device and the wireless network, whereby the LLC entity in the wireless communication device obtains information for enabling enciphering and deciphering in subsequent communication between the LLC entity in the wireless communication device and the LLC entity in the wireless network.

The instructions that are executable by the processor 602 may be software in the form of a computer program 641. The computer program 641 may be contained in or by a carrier 642, which may provide the computer program 641 to the memory 604 and processor 602. The carrier 642 may be in any suitable form including an electronic signal, an optical signal, a radio signal or a computer readable storage medium.

In some embodiments, the provision of an authentication procedure trigger from the GMM entity in the wireless communication device to the GMM entity in the wireless network comprises transmitting any of a routing area update request message and an attach request message that comprises a ciphering key sequence number, CKSN, information element having a value of 7.

In some embodiments, the GMM entity in the wireless communication device receives a CKSN in a GMM authentication and ciphering request message, the received CKSN identifying a security context that comprises a security key.

In some embodiments, the memory 604 contains instructions executable by the processor 602 whereby the wireless communication device 600 is further operative to:

obtain, in the GMM entity in the wireless communication device, the security key from the security context identified by the received CKSN, and the obtaining of the information for enabling enciphering and deciphering in subsequent communication between the LLC entity in the wireless communication device and the LLC entity in the wireless network comprises:

receiving, in the LLC entity in the wireless communication device, the security key from the GMM entity in the wireless communication device.

In some embodiments, the reception of enciphered downlink data comprises reception of enciphered GMM data via a logical link entity having a service access point identifier, SAPI, equal to 1, and the determination that the enciphered downlink data cannot be deciphered comprises a determination of a first predetermined number of cyclic redundancy check, CRC, failures associated with the received enciphered GMM data.

In some embodiments, the reception of enciphered downlink data comprises reception of enciphered user data via a logical link entity having a service access point identifier, SAPI, equal to any of 3, 5, 7, 9 and 11, and the determination that the enciphered downlink data cannot be deciphered comprises a determination of a second predetermined number of CRC failures associated with the received enciphered user data.

In some embodiments, the second predetermined number of CRC failures associated with the received enciphered user data is greater than the first predetermined number of CRC failures associated with the received enciphered GMM data.

Figure 7:
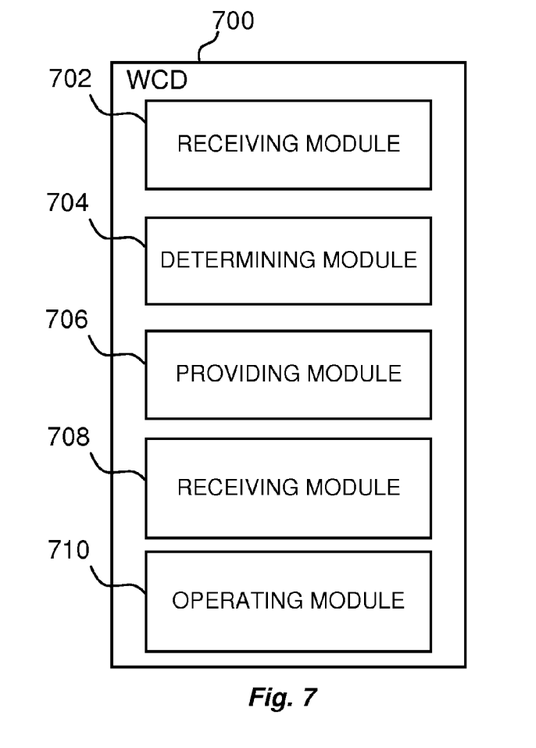

Turning now to FIG. 7, embodiments of a wireless communication device 700 will be described in some more detail. The wireless communication device 700, which may be one of the wireless communication devices 106, 506 discussed above in connection with FIGS. 1-5, is for communication with a wireless network, such as the wireless network 100. The wireless communication device 700 comprises:

a receiving module (702) configured to receive, in a logical link control, LLC, entity in the wireless communication device, enciphered downlink data from a LLC entity in the wireless network, a determination module (704) configured to determine, in the LLC entity in the wireless communication device, that the enciphered downlink data cannot be deciphered, a providing module (706) configured to provide, from the LLC entity in the wireless communication device as a consequence of the determination that the enciphered downlink data cannot be deciphered, a ciphering failure indicator to a GPRS mobility management, GMM, entity in the wireless communication device, a receiving module (708) configured to receive, in the GMM entity in the wireless communication device, the ciphering failure indicator and, as a consequence of the reception of the ciphering failure indicator in the GMM entity in the wireless communication device, providing an authentication procedure trigger from the GMM entity in the wireless communication device to a GMM entity in the wireless network, and an operating module (710) configured to operate an authentication procedure wherein the GMM entity in the wireless communication device communicates with the GMM entity in the wireless network via the respective LLC entities in the wireless communication device and the wireless network, whereby the LLC entity in the wireless communication device obtains information for enabling enciphering and deciphering in subsequent communication between the LLC entity in the wireless communication device and the LLC entity in the wireless network.

The wireless communication device 700 may comprise further modules that are configured to perform in a similar manner as, e.g., the wireless communication device 600 described above in connection with FIG. 6.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method performed by a wireless communication device when communicating with a general packet radio service, GPRS, wireless network, the method comprising:
    receiving, in a logical link control, LLC, entity in the wireless communication device, enciphered downlink data from a LLC entity in the wireless network,
    determining, in the LLC entity in the wireless communication device, that the enciphered downlink data cannot be deciphered,
    providing, from the LLC entity in the wireless communication device as a consequence of the determination that the enciphered downlink data cannot be deciphered, a ciphering failure indicator to a GPRS mobility management, GMM, entity in the wireless communication device,
    receiving, in the GMM entity in the wireless communication device, the ciphering failure indicator and, as a consequence of the reception of the ciphering failure indicator in the GMM entity in the wireless communication device, providing an authentication procedure trigger from the GMM entity in the wireless communication device to a GMM entity in the wireless network, and
    operating an authentication procedure wherein the GMM entity in the wireless communication device communicates with the GMM entity in the wireless network via the respective LLC entities in the wireless communication device and the wireless network, whereby the LLC entity in the wireless communication device obtains information including identification of a security context comprising a security key for enabling enciphering and deciphering in subsequent communication between the LLC entity in the wireless communication device and the LLC entity in the wireless network.

2. The method of claim 1, wherein the provision of an authentication procedure trigger from the GMM entity in the wireless communication device to the GMM entity in the wireless network comprises transmitting any of a routing area update request message and an attach request message that comprises a ciphering key sequence number, CKSN, information element having a value of 7.

3. The method of claim 2, wherein the GMM entity in the wireless communication device receives a CKSN in a GMM authentication and ciphering request message, the received CKSN identifying the security context that comprises the security key.

4. The method of claim 3, comprising:
    obtaining, in the GMM entity in the wireless communication device, the security key from the security context identified by the received CKSN, and
    wherein the obtaining of the information for enabling enciphering and deciphering in subsequent communication between the LLC entity in the wireless communication device and the LLC entity in the wireless network comprises:
    receiving, in the LLC entity in the wireless communication device, the security key from the GMM entity in the wireless communication device.

5. The method of claim 1, wherein:
    the reception of enciphered downlink data comprises reception of enciphered GMM data via a logical link entity having a service access point identifier, SAPI, equal to 1, and wherein
    the determination that the enciphered downlink data cannot be deciphered comprises a determination of a first predetermined number of cyclic redundancy check, CRC, failures associated with the received enciphered GMM data.

6. The method of claim 1, wherein:
    the reception of enciphered downlink data comprises reception of enciphered user data via a logical link entity having a service access point identifier, SAPI, equal to any of 3, 5, 7, 9 and 11, and wherein
    the determination that the enciphered downlink data cannot be deciphered comprises a determination of a second predetermined number of CRC failures associated with the received enciphered user data.

7. The method of claim 6, wherein the second predetermined number of CRC failures associated with the received enciphered user data is greater than a first predetermined number of CRC failures associated with the received enciphered GMM data.

8. A wireless communication device for communicating with a general packet radio service, GPRS, wireless network, the wireless communication device comprising radio frequency, RF, circuitry, a processor and a memory, said memory containing instructions executable by said processor whereby said wireless communication device is operative to:
    receive, in a logical link control, LLC, entity in the wireless communication device, enciphered downlink data from a LLC entity in the wireless network,
    determine, in the LLC entity in the wireless communication device, that the enciphered downlink data cannot be deciphered,
    provide, from the LLC entity in the wireless communication device as a consequence of the determination that the enciphered downlink data cannot be deciphered, a ciphering failure indicator to a GPRS mobility management, GMM, entity in the wireless communication device, receive, in the GMM entity in the wireless communication device, the ciphering failure indicator and, as a consequence of the reception of the ciphering failure indicator in the GMM entity in the wireless communication device, providing an authentication procedure trigger from the GMM entity in the wireless communication device to a GMM entity in the wireless network, and operate an authentication procedure wherein the GMM entity in the wireless communication device communicates with a GMM entity in the wireless network via the respective LLC entities in the wireless communication device and the wireless network, whereby the LLC entity in the wireless communication device obtains information including identification of a security context comprising a security key for enabling enciphering and deciphering in subsequent communication between the LLC entity in the wireless communication device and the LLC entity in the wireless network.

9. The wireless communication device of claim 8, operative such that the provision of an authentication procedure trigger from the GMM entity in the wireless communication device to the GMM entity in the wireless network comprises transmitting any of a routing area update request message and an attach request message that comprises a ciphering key sequence number, CKSN, information element having a value of 7.

10. The wireless communication device of claim 9, operative such that the GMM entity in the wireless communication device receives a CKSN in a GMM authentication and ciphering request message, the received CKSN identifying the security context that comprises the security key.

11. The wireless communication device of claim 10, operative to:
obtain, in the GMM entity, the security key from the security context identified by the received CKSN, and
operative such that the obtaining of the information for enabling enciphering and deciphering in subsequent communication between the LLC entity in the wireless communication device and the LLC entity in the wireless network comprises:
receiving, in the LLC entity in the wireless communication device, the security key from the GMM entity in the wireless communication device.

12. The wireless communication device of claim 8, operative such that:
the reception of enciphered downlink data comprises reception of enciphered GMM data via a logical link entity having a service access point identifier, SAPI, equal to 1, and wherein
the determination that the enciphered downlink data cannot be deciphered comprises a determination of a first predetermined number of cyclic redundancy check, CRC, failures associated with the received enciphered GMM data.

13. The wireless communication device of claim 8, operative such that:
the reception of enciphered downlink data comprises reception of enciphered user data via a logical link entity having a service access point identifier, SAPI, equal to any of 3, 5, 7, 9 and 11, and wherein
the determination that the enciphered downlink data cannot be deciphered comprises a determination of a second predetermined number of CRC failures associated with the received enciphered user data.

14. The wireless communication device of claim 13, wherein the second predetermined number of CRC failures associated with the received enciphered user data is greater than a first predetermined number of CRC failures associated with the received enciphered GMM data.

15. A nontransitory computer readable storage medium, comprising instructions which, when executed on at least one processor in a wireless communication device, cause the wireless communication device to carry out a method when communicating with a general packet radio service, GPRS, wireless network, the method comprising:
receiving, in a logical link control, LLC, entity in the wireless communication device, enciphered downlink data from a LLC entity in the wireless network,
determining, in the LLC entity in the wireless communication device, that the enciphered downlink data cannot be deciphered,
providing, from the LLC entity in the wireless communication device as a consequence of the determination that the enciphered downlink data cannot be deciphered, a ciphering failure indicator to a GPRS mobility management, GMM, entity in the wireless communication device,
receiving, in the GMM entity in the wireless communication device, the ciphering failure indicator and, as a consequence of the reception of the ciphering failure indicator in the GMM entity in the wireless communication device, providing an authentication procedure trigger from the GMM entity in the wireless communication device to a GMM entity in the wireless network, and
operating an authentication procedure wherein the GMM entity in the wireless communication device communicates with the GMM entity in the wireless network via the respective LLC entities in the wireless communication device and the wireless network, whereby the LLC entity in the wireless communication device obtains information including identification of a security context comprising a security key for enabling enciphering and deciphering in subsequent communication between the LLC entity in the wireless communication device and the LLC entity in the wireless network.

* * * * *